(12) United States Patent
Krammer

(10) Patent No.: US 8,366,214 B2
(45) Date of Patent: Feb. 5, 2013

(54) DAMPER

(75) Inventor: Bernhard Krammer, Grünau (AT)

(73) Assignee: Julius Blum GmbH, Hoechst (AT)

( * ) Notice: Subject to any disclaimer, the term of this patent is extended or adjusted under 35 U.S.C. 154(b) by 733 days.

(21) Appl. No.: 12/522,468

(22) PCT Filed: Nov. 9, 2007

(86) PCT No.: PCT/AT2007/000506
§ 371 (c)(1),
(2), (4) Date: Jul. 8, 2009

(87) PCT Pub. No.: WO2008/083417
PCT Pub. Date: Jul. 17, 2008

(65) Prior Publication Data
US 2010/0038196 A1    Feb. 18, 2010

(30) Foreign Application Priority Data
Jan. 11, 2007 (AT) .................................. A 52/2007

(51) Int. Cl.
*A47B 88/00* (2006.01)
(52) U.S. Cl. .................. 312/327; 312/319.2; 312/334.1; 16/286; 188/290
(58) Field of Classification Search .... 312/319.1–319.2, 312/326–329, 334.1, 334.6–334.8; 16/286, 16/54, 50; 188/290–296
See application file for complete search history.

(56) References Cited

U.S. PATENT DOCUMENTS

| | | | |
|---|---|---|---|
| 2,912,237 A * | 11/1959 | Snyder | 49/199 |
| 4,796,733 A | 1/1989 | Nakayama | |
| 4,856,625 A * | 8/1989 | Oshida | 188/282.1 |
| 5,598,607 A | 2/1997 | Katagiri | |
| 5,904,411 A | 5/1999 | Hayakawa | |
| 7,178,202 B2 * | 2/2007 | Hirtsiefer et al. | 16/366 |

(Continued)

FOREIGN PATENT DOCUMENTS

| AT | 5125 | 9/1901 |
|---|---|---|
| AT | 412 183 | 11/2004 |

(Continued)

OTHER PUBLICATIONS

International Search Report issued Mar. 6 2008 in the International (PCT) Application PCT/AT2007/000506 of which the present application is the U.S. National Stage.

(Continued)

*Primary Examiner* — Hanh V Tran
(74) *Attorney, Agent, or Firm* — Wenderoth, Lind & Ponack, L.L.P.

(57) ABSTRACT

A damper has at least two damping components which are mounted such that they can move relative to each other during a damping stroke. A damping medium acts between the damping components, and at least one actuating element is operatively connected to the first damping component at least during the damping stroke of the damper. A locking device is arranged between the second damping component and a retaining part. The locking device couples the second damping component fixedly to the retaining part during the damping stroke of the damper. During the return stroke of the damper, the locking device decouples the second damping component from the retaining part so as to realize a free-wheeling motion such that, during the return stroke of the damper, the second damping component moves together with the first damping component.

38 Claims, 16 Drawing Sheets

U.S. PATENT DOCUMENTS

Figure 1:
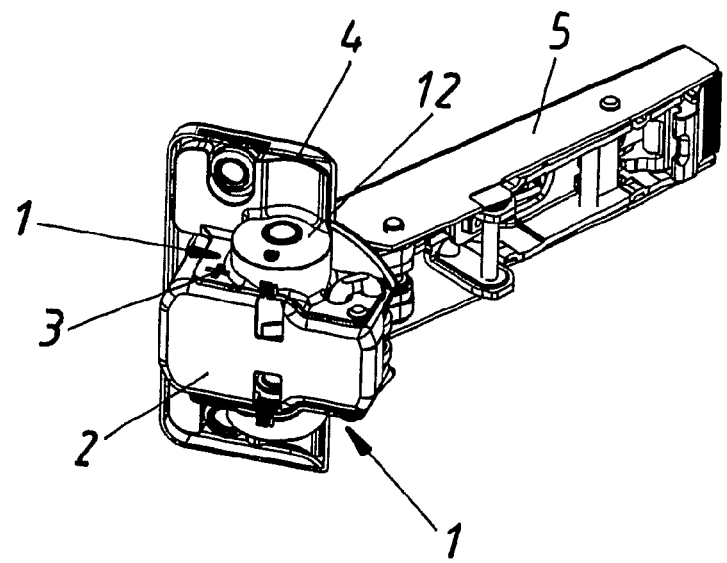

| | | |
|---|---|---|
| 2002/0032951 A1 | 3/2002 | Migli |
| 2002/0096405 A1 | 7/2002 | Gasser |
| 2004/0144604 A1 | 7/2004 | Doornbos et al. |
| 2006/0011428 A1* | 1/2006 | Hayashi et al. ............... 188/290 |
| 2006/0113154 A1* | 6/2006 | Hayashi et al. ............... 188/290 |

FOREIGN PATENT DOCUMENTS

| | | |
|---|---|---|
| DE | 37 26 031 | 2/1988 |
| DE | 202 21 066 | 12/2004 |
| EP | 0 538 605 | 4/1993 |
| EP | 0 807 741 | 11/1997 |
| EP | 1 188 891 | 3/2002 |
| JP | 17-1915 | 2/1942 |
| JP | 35-243 | 1/1960 |
| JP | 48-22425 | 7/1973 |
| JP | 58-32874 | 3/1983 |
| JP | 7-207294 | 8/1995 |
| JP | 9-14791 | 2/1997 |
| JP | 9-96329 | 4/1997 |
| JP | 9-206244 | 8/1997 |
| WO | 2005/055767 | 6/2005 |
| WO | WO 2005108728 A1 * | 11/2005 |

OTHER PUBLICATIONS

Translation of Search Report issued Jul. 20, 2007 in connection with A 52/2007 corresponding to the present U.S. application.

* cited by examiner

Fig. 12
Fig. 13
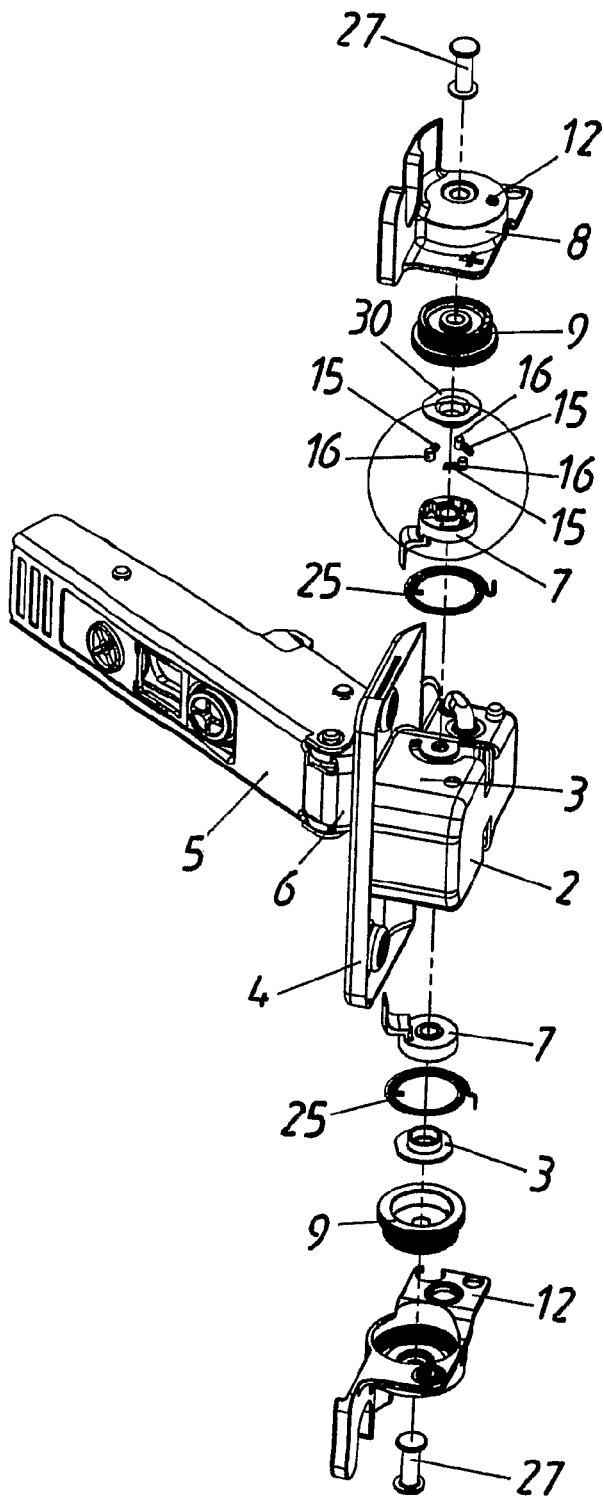
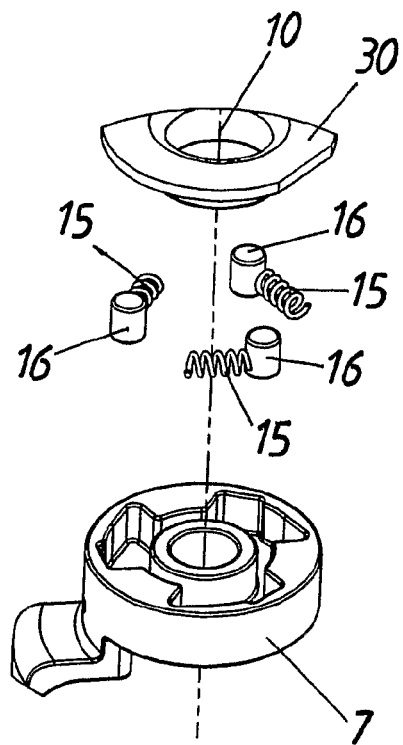

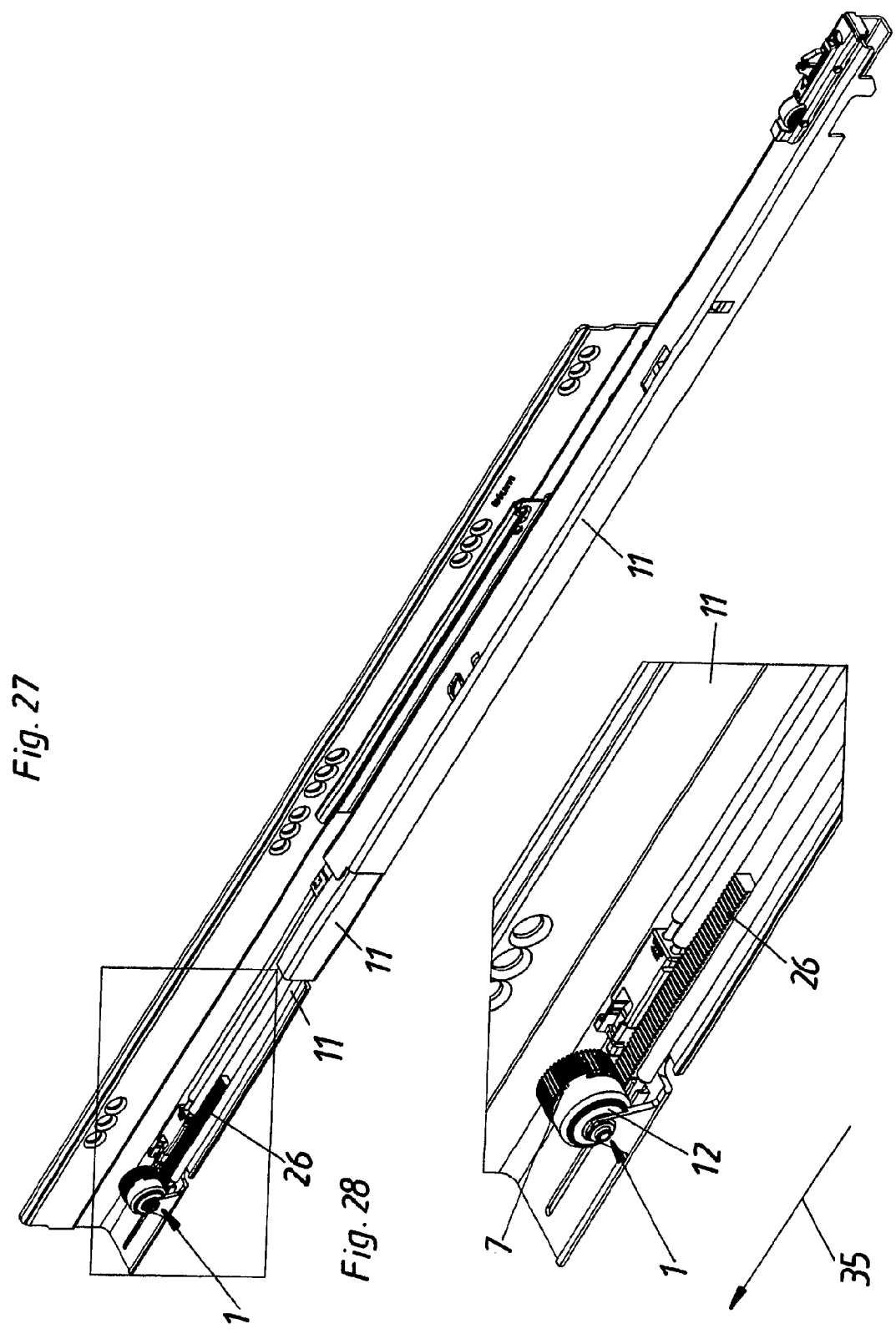

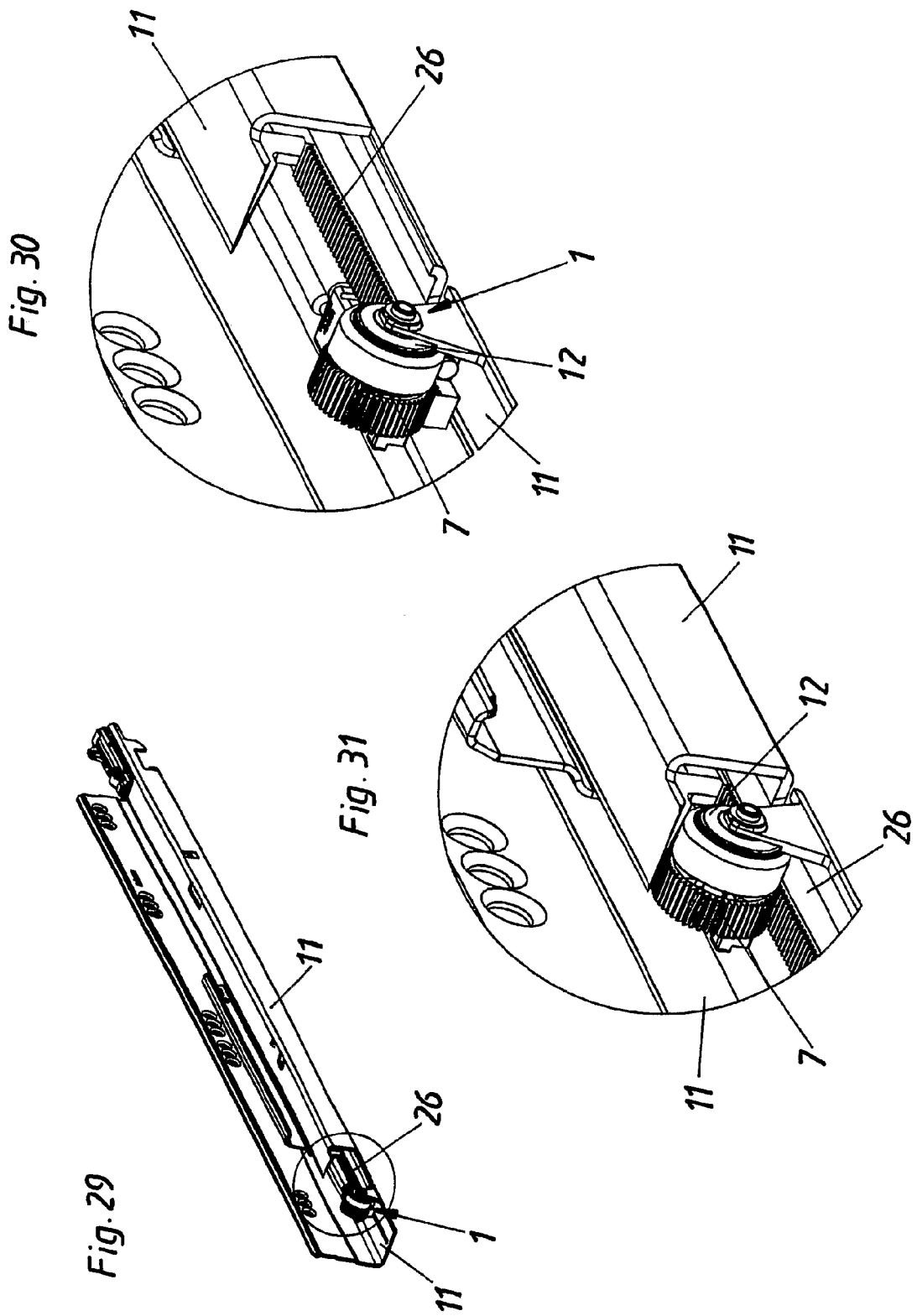

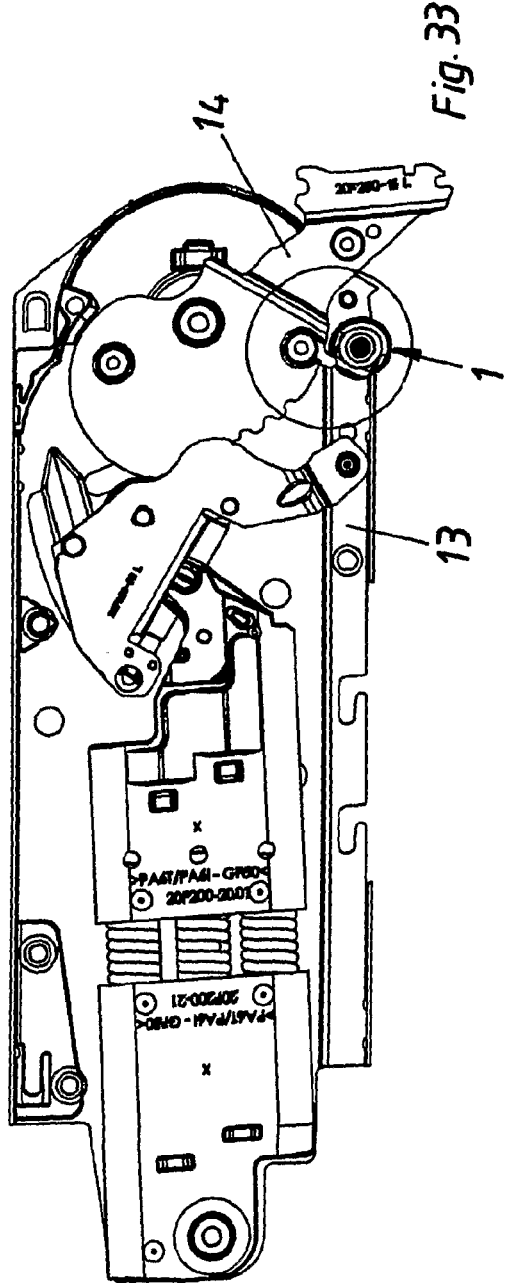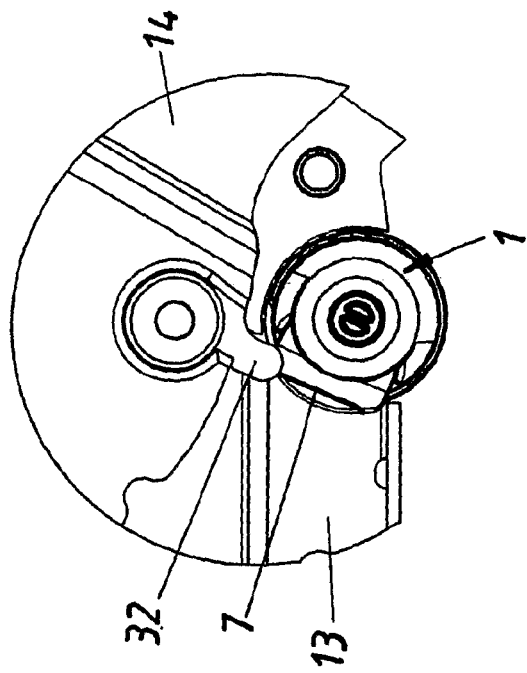

DAMPER

This application is a continuation application of International application PCT/AT2007/000506, filed Nov. 9, 2007, the entire disclosure of which is incorporated herein by reference.

The present invention relates to a damper for furniture parts and/or pieces of furniture fittings being movable relative to each other, wherein the damper comprises at least two damping parts which are mounted movably relative to each other in a damping stroke and a damping medium being arranged or operative between those damping parts, and at least one actuating element operatively connected to the first damping part at least in the damping stroke of the damper, wherein an arresting device is arranged between the second damping part and a holding part, wherein the arresting device fixedly couples the second damping part to the holding part in the damping stroke of the damper and wherein the arresting device uncouples the second damping part from the holding part to provide a freewheel relationship in the return stroke of the damper so that the second damping part moves together with the first damping part in the return stroke of the damper.

In the state of the art it is known to produce relatively complicated and expensive valve structures in furniture dampers in order at the end of the damping stroke to permit a return stroke, at the end of which the actuating element or the damper and its damping parts have regained a starting position for the next damping stroke. Those valve-like structures permit a return flow of the damping medium and thus a return movement of the damping parts. In general however those valve-like structures are very complicated in construction and manufacture and allow only very slight tolerances.

It is therefore an object of the invention to provide a possible way of affording a return stroke, with which it is possible to dispense with the above-mentioned valve-like structures.

According to the invention that is achieved in that the arresting device has at least one movably mounted arresting element which is spring-loaded in the direction of the arresting position and which in the arresting position couples the second damping component to the holding part.

In the illustrated embodiments the holding part is formed by the damper housing or by a central projection.

That provides that direct initiation of the damping stroke is ensured upon corresponding actuation of the actuating element. The damping parts and the actuating element can reach their starting position for the damping stroke at the end of the return stroke, without the damping parts and the damping medium, by way of expensive and complicated valve structures, having to permit a return flow or a return movement. More specifically in accordance with a basic idea of the invention it is provided that the damping parts between which the damping medium is operative or is arranged can remain in their relative position with respect to each other during the return stroke. That is made possible by virtue of the provision of a freewheel relationship which permits the return stroke without the damping parts of the damper having to be moved relative to each other for that purpose.

That permits the damper to be of a particularly simple and thus inexpensive structure, with few and comparatively simple components. In addition, dispensing with complicated and expensive valve structures means that it is generally possible to operate with large through-flow cross-sections, thereby affording only very slight tolerance demands which are easy to meet.

The invention can be implemented in a particularly advantageous fashion in dampers in which at least one of the two damping parts is so mounted that during the damping stroke, preferably exclusively, it performs a rotary movement relative to the other damping part. Such dampers are frequently referred to as rotary dampers. There are however also those dampers in which both linear and also rotary movements are performed. Dampers according to the invention which are technically particularly simple to embody provide in that respect that the actuating element is so mounted that it performs preferably exclusively a rotary movement during the damping stroke and/or during the return stroke. In a particularly simple structure it can then be provided that the actuating element and at least one of and preferably all the damping parts are mounted rotatably about a common axis of rotation and/or the actuating element and the damping components form a structural unit which is inseparable during operation of the damper, wherein that structural unit is provided for mounting to only one of the relatively movable furniture parts and/or to the pieces of the furniture fittings.

To permit the two damping parts to remain in a constant relative position with respect to each other, the freewheel relationship can be arranged or operative for example between the actuating element and one of the damping parts but also between one of the damping parts and a damper housing of the damper, provided for fixing to only one of the relatively movable furniture parts and/or to the pieces of the furniture fitting.

Desirably an arresting device having an arresting position and a freewheel position is provided for implementing the freewheel relationship. In the arresting position or in the damping stroke the arresting device can then arrest either the actuating element and one of the damping parts or one of the damping parts and the above-mentioned damper housing, to each other. In the freewheel position of the arresting device it is then provided that the arresting device releases the above-mentioned, previously mutually arrested components for a relative movement with respect to each other.

To ensure initiation which is as immediate as possible of the damping stroke upon a corresponding actuation of the actuating element, it is provided that the arresting device is pressurized in the direction of its arresting position, preferably by means of a spring element. To permit that, the arresting device can have for example biased clamping bodies or one or more biased locking pawls or brake shoes as is shown by means of various embodiments in the specific description hereinafter.

In principle all damping media known in the state of the art such as for example silicone oils and the like can be used in dampers according to the invention. The dampers according to the invention however can be particularly desirably used with damping media which at least at times are of a very high viscosity or viscousness. That then also reduces the sealing problems known in relation to the relatively highly fluid silicone oils. So-called dilatant media or fluids are particularly preferably used. These are media whose viscosity increases with increasing shearing speed. In that respect that behaviour desirably occurs in a working range which is usual for movable furniture parts and fittings thereof, with angular speeds of between 0 and 1200°/sec, preferably between 0 and 600°/sec, or linear speeds of between 0 and 100 mm/sec, preferably between 0 and 50 mm/sec. Particularly advantageous damping media are in that respect boron-bearing polysiloxanes which present a corresponding behaviour at least in an approximation thereto. They generally consist of linear dimethylpolysiloxanes which bear an Si—O—B bond at each third to hundredth Si atom. Those media are commercially available under the trade name 'Bouncing Putty'. Those media combine two basically different properties. Under a slow loading they show themselves to be a plastically viscous mass which runs when left to stand. In the case of abruptly occurring forces however they behave like a highly elastic body. The use of such media which preferably plastically and/or viscously run under a shear loading at a first speed and predominantly elastically react in the case of a preferably shock shear loading at a second shearing speed higher than the first one, has the advantage that it is possible to have recourse to very simple constructions in respect of the damping parts, between which the damping medium is arranged. That is possible as the damping medium itself already generates a reaction adapted to the forces applied from the exterior. Thus in the case of only slight, slowly occurring forces acting from the exterior, the damping or delay action is slight and increases by virtue of the properties, in particular by virtue of increasing viscosity, of the medium, in the event of a very fast increase in the forces applied from the exterior, of its own accord, without the need for complicated and expensive valve structures which are known for that purpose in the state of the art, involving changing through-flow cross-sections, or the like.

The dampers according to the invention with a freewheel action can however also be used for Newtonian media or fluids which comply with a linear flow law.

Figure 2:
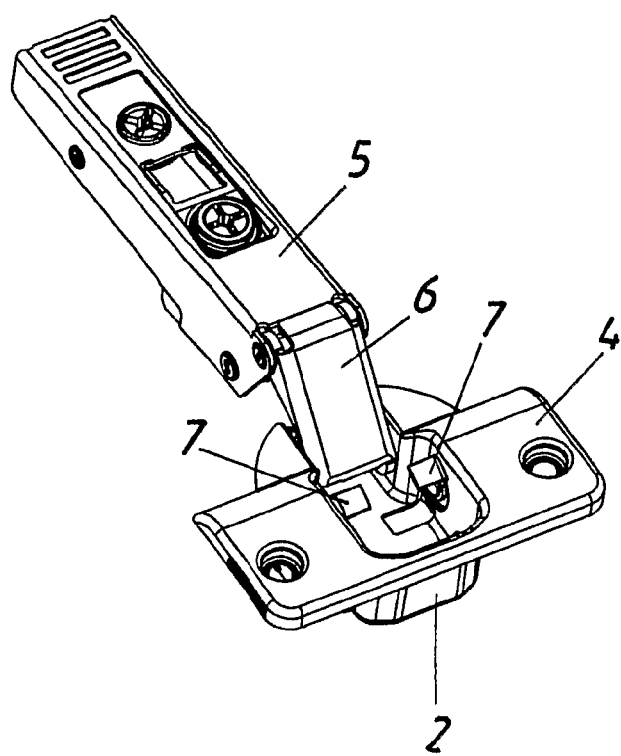
Figure 3:
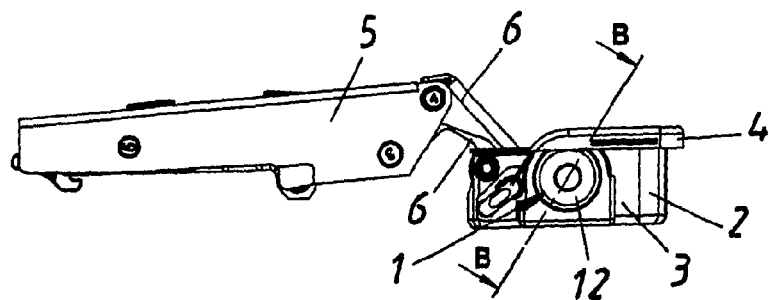
Figure 4:
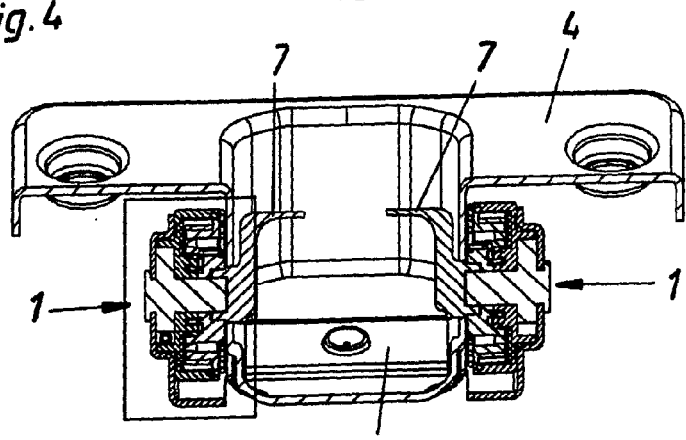
Figure 5:
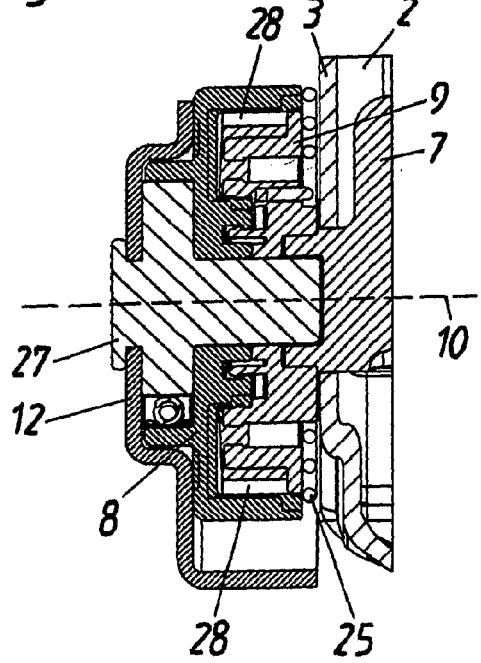
Figure 6:
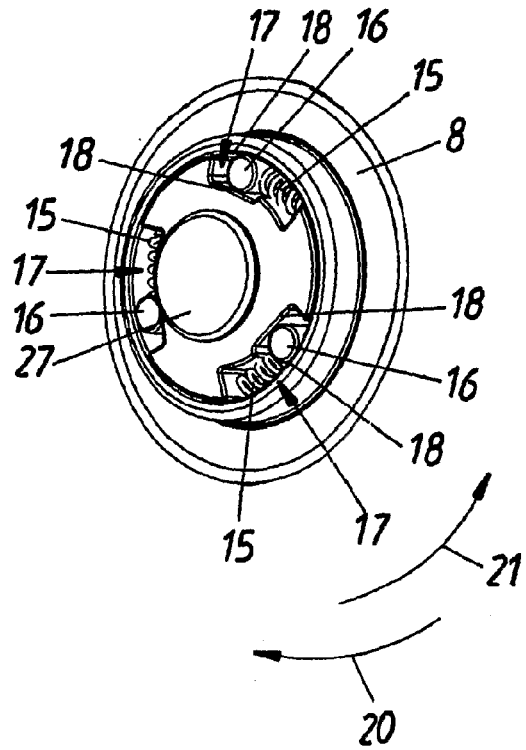
Figure 7:
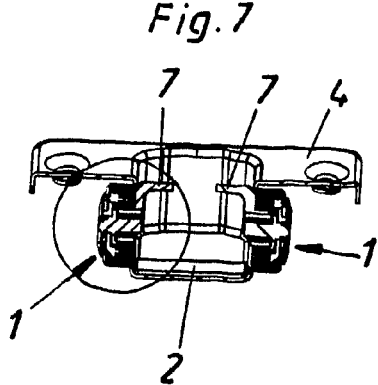
Figure 8:
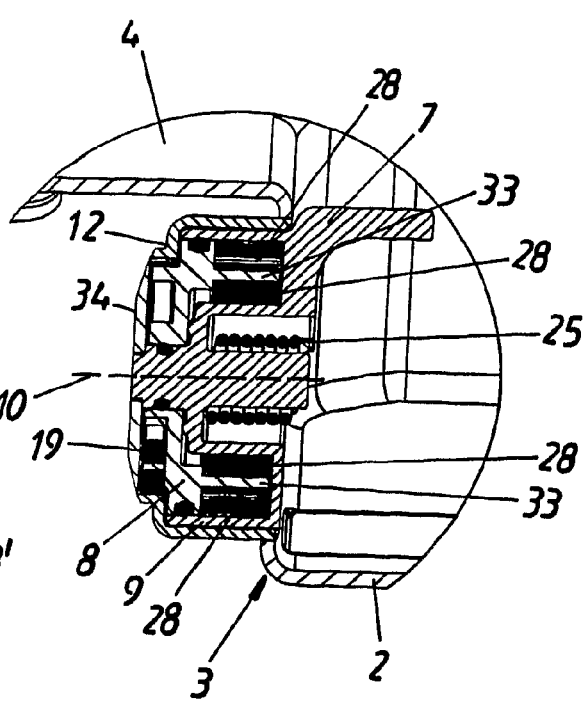
Figure 19:
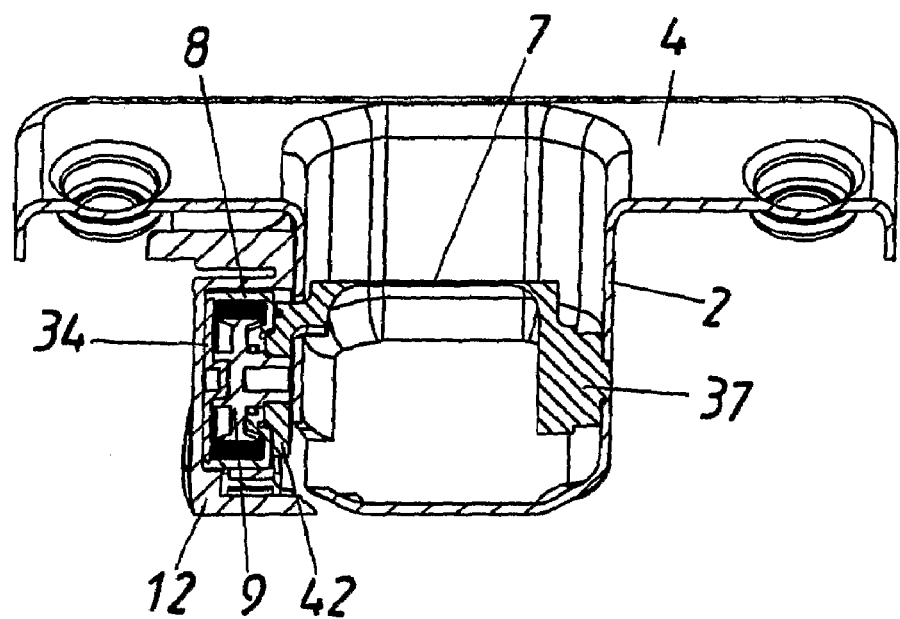
Figure 20:
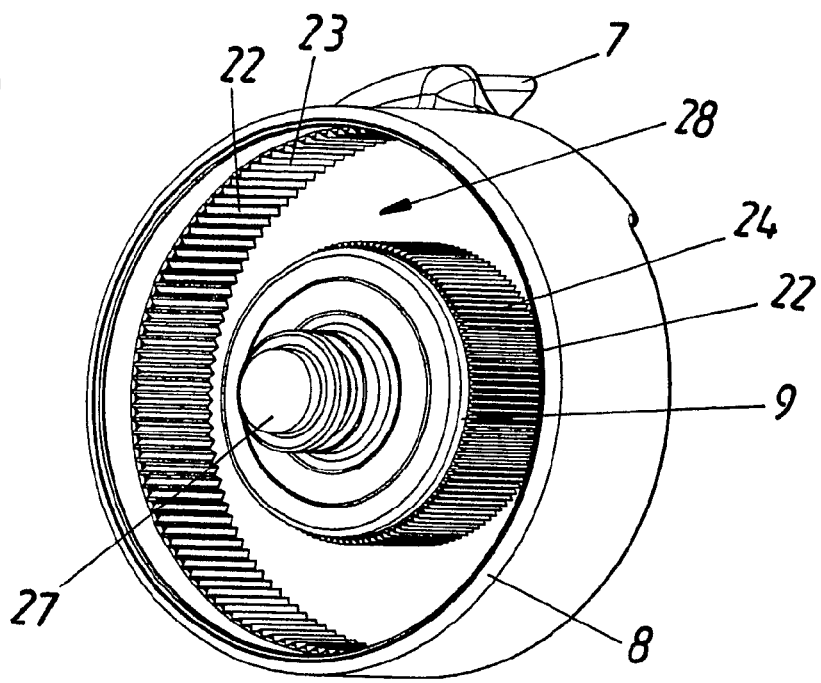
Figure 21:
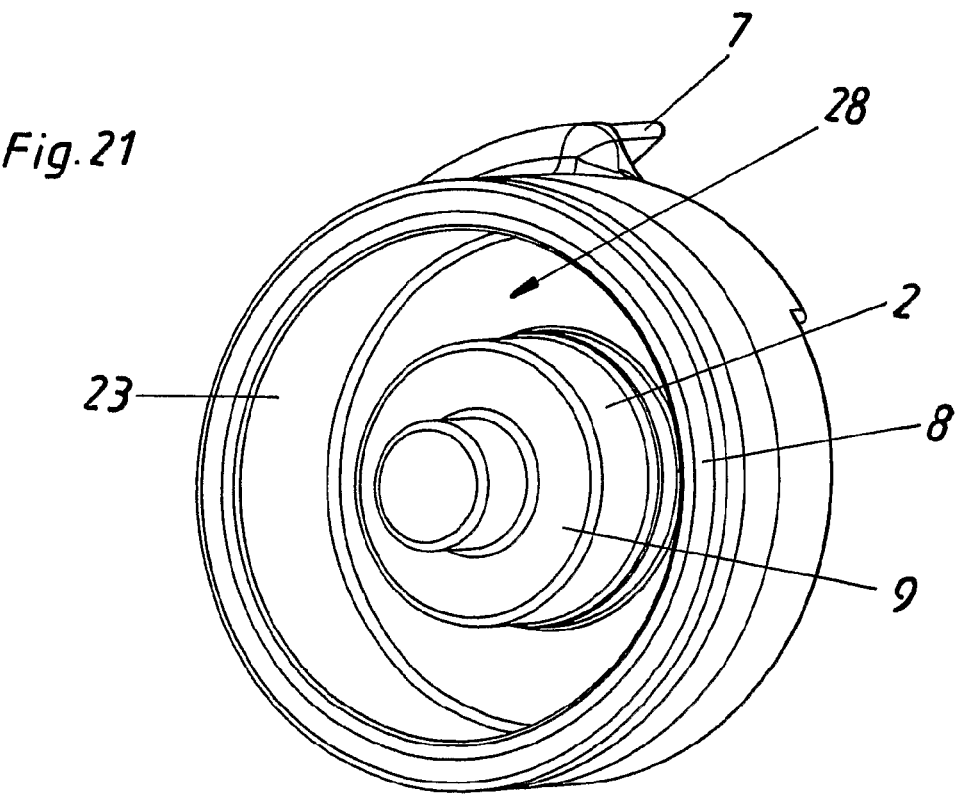
Figure 22A:
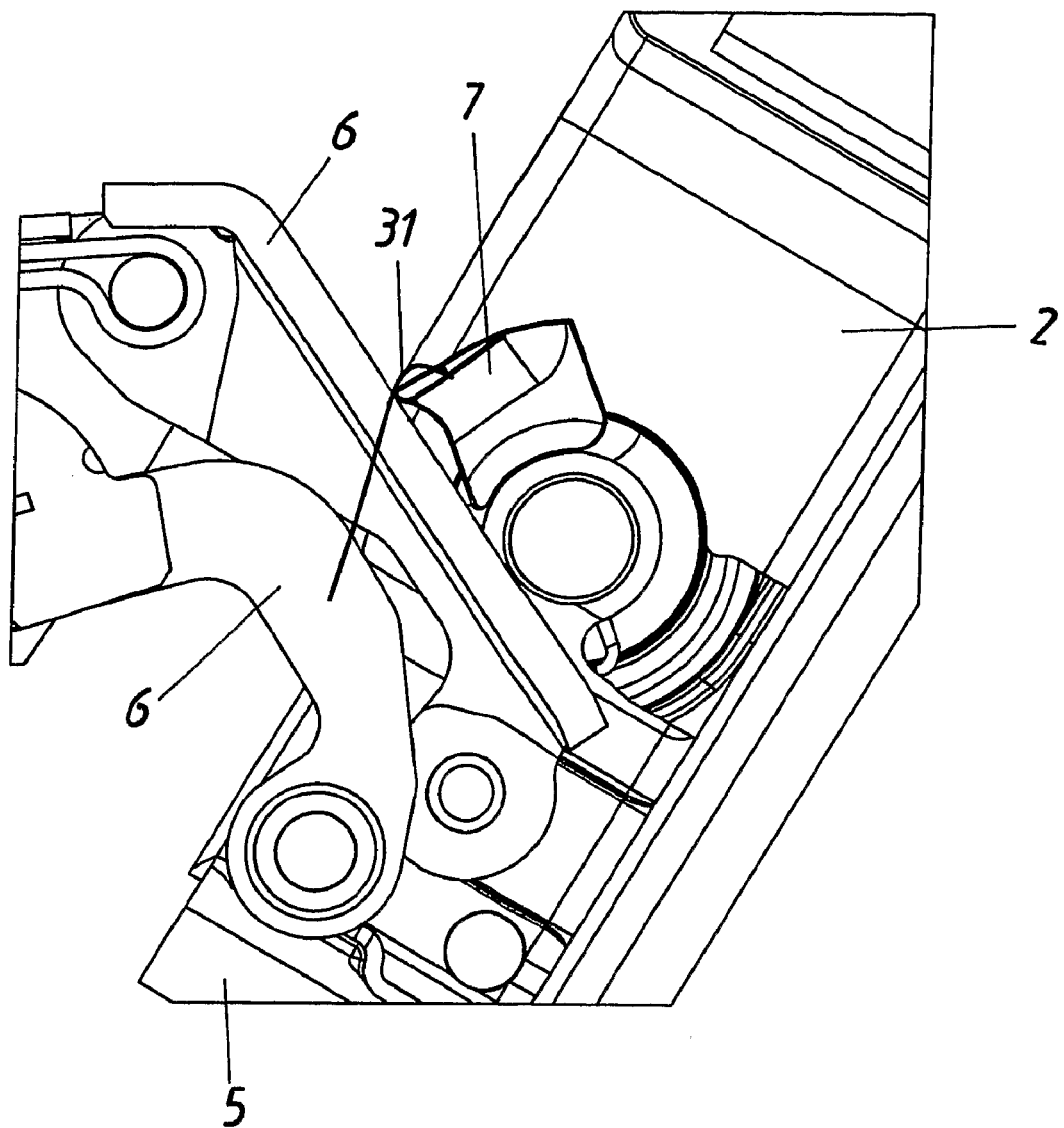
Figure 22B:
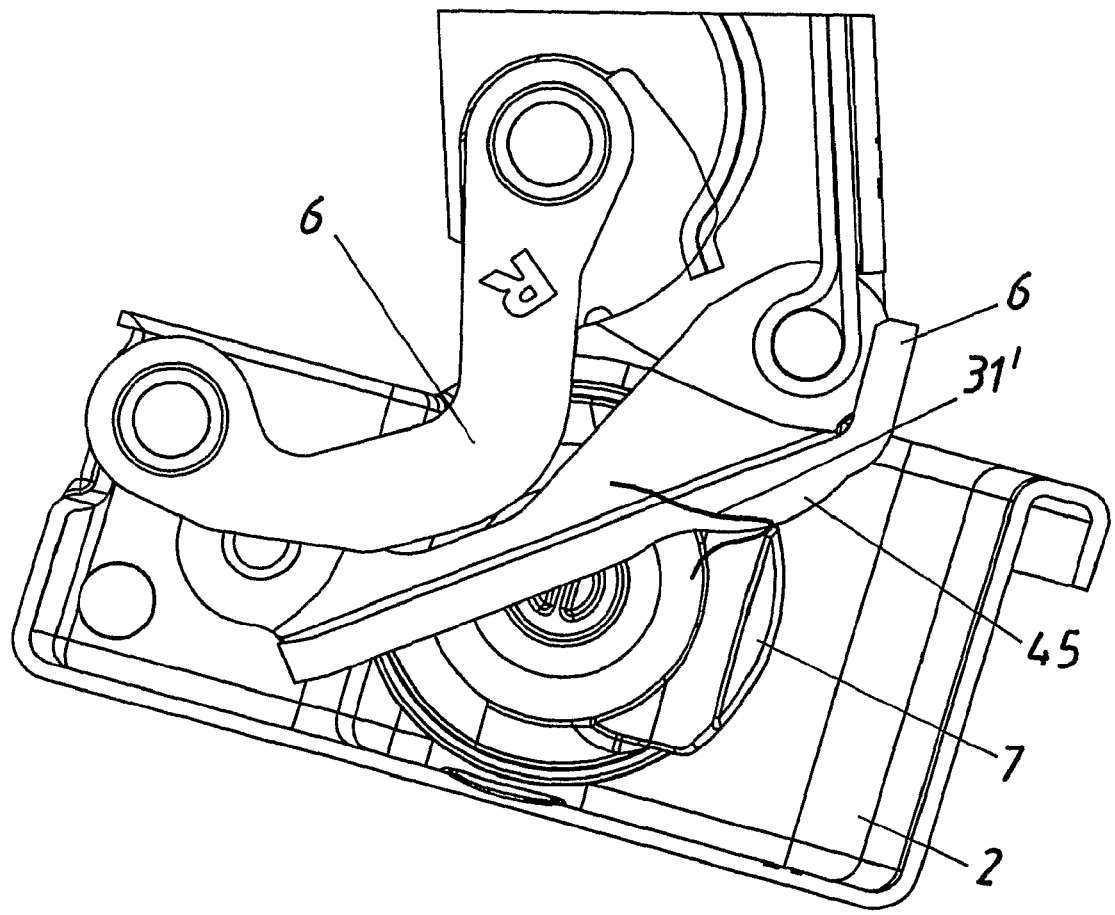
Figure 23:
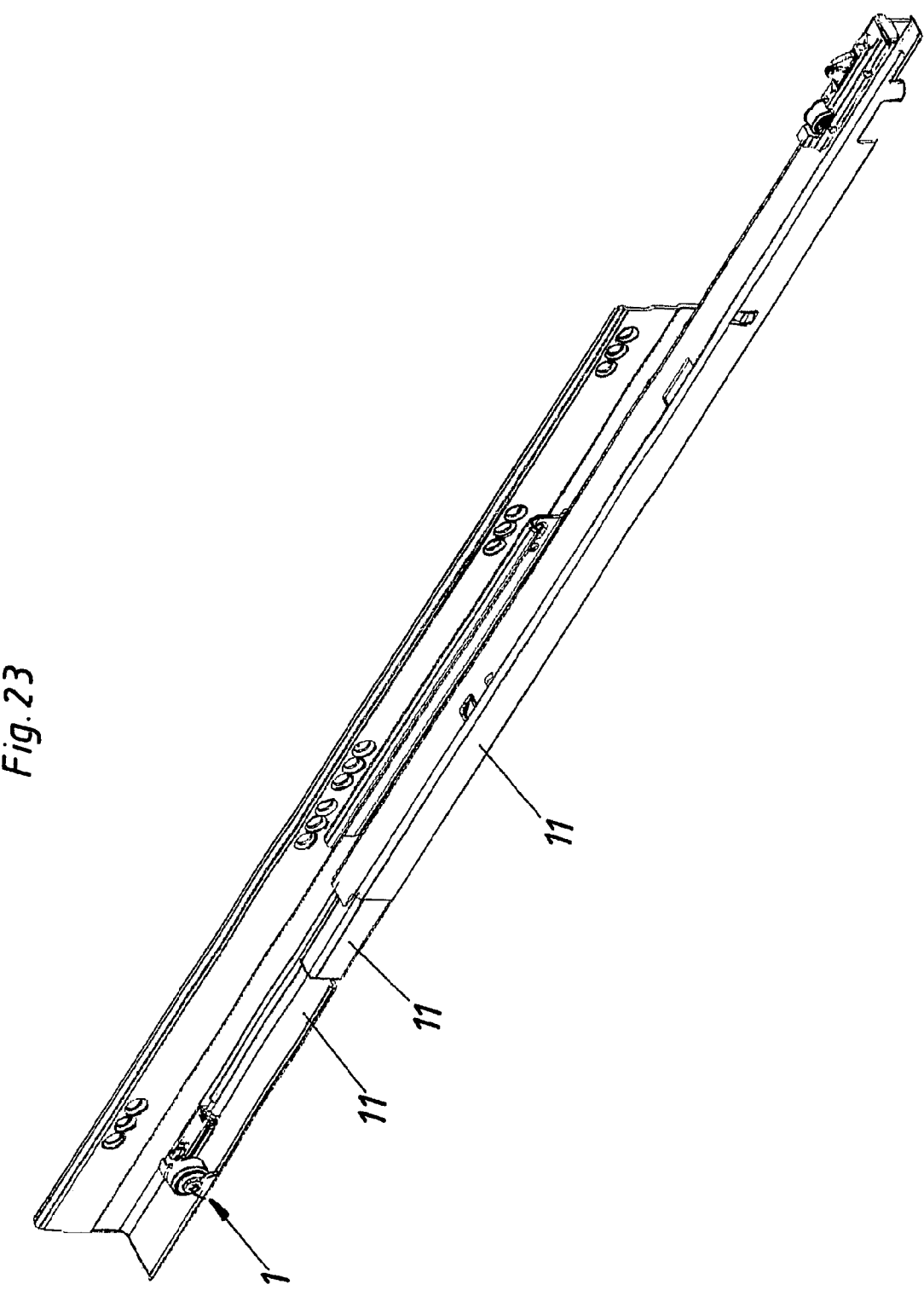

Various embodiments according to the invention of dampers and their arrangement and use in relation to various furniture fittings are now described hereinafter with reference to the accompanying Figures in which:

FIGS. 1-3 show a particularly preferred arrangement of dampers according to the invention on the hinge cup of a furniture hinge, FIGS. 4-6 show detail views in relation to a first such embodiment, FIGS. 7-9b show a second such embodiment, FIGS. 10-13 show a third such embodiment according to the invention, FIGS. 14-19 show a fourth such embodiment according to the invention, FIGS. 20, 21 show preferred variants of the damping components enclosing the damping medium, FIGS. 22a, 22b show operating curves of an actuating element on various hinge levers of a furniture hinge, FIGS. 23-31 show two different possible options in regard to using a damper according to the invention for drawer guides, and FIGS. 32, 33 show the use of a damper according to the invention in relation to an adjusting arm hinge for an upward folding flap.

FIGS. 1 through 3 show—as known per se—a furniture hinge having a hinge arm 5 and a hinge cup 2 as abutment parts which are pivotally connected together by way of two hinge levers 6. The view from below in FIG. 1 shows a particularly preferred manner of mounting a damper 1 according to the invention to the furniture hinge. In the assembled position, the damper 1 is mounted beneath the fixing flange 4 of the hinge cup 2 at the lateral outside wall 3 thereof. The illustrated embodiments each have two dampers arranged in such a way. The dampers, together with the hinge cup 2, can be sunk in a standard mounting hole for the hinge cup 2 in the article of furniture. In the assembled condition, only the two pivotable actuating elements 7 of the damper, which are arranged in the interior of the hinge cup 2, can then still be seen. That is a particularly space-saving and inconspicuous way of fitting the damper to the furniture hinge. FIG. 3 shows a side view of that kind of structure.

FIGS. 4 through 6 show a first configuration according to the invention illustrating the way in which the freewheel can be embodied. For descriptive purposes, sections through the dampers 1 are shown in FIG. 4 and on an enlarged scale in FIG. 5. FIG. 6 shows a perspective plan view illustrating the variant of an arresting device for providing the freewheel action, which is used in this embodiment. The actuating element 7 is acted upon by the outer hinge lever 6 in the relative pivotal movement of the hinge cup 2 with respect to the hinge arm 5, resulting in a rotary movement of the actuating element 7 about the common axis of rotation 10. In that rotary movement, the actuating element 7 entrains the second damping part 9 which is non-rotatably connected thereto. An annular free space 28 for the damping medium is provided between the second damping part 9 and the first damping part 8 so that the damping medium is operative between the two damping parts 8 and 9. The first damping part 8 is mounted rotatably relative to the second damping part 9 about the common axis of rotation 10. The second damping part 8 is connected to the damper housing 12 by way of the freewheel arrangement according to the invention. The damper housing 12 and therewith also the central projection 27 are in turn fixed non-rotatably to the hinge cup 2. The arresting device permitting the freewheel action in this embodiment is particularly clearly shown in a perspective side view in FIG. 6. In this case the damper housing 12 non-rotatably connected to the central projection 27 is omitted in order to be able to see the arresting device. The latter comprises three cylindrical clamping bodies 16 which are respectively guided in guide grooves 17 which narrow in the direction 21, and are pressurized in the direction 21 by means of the coil springs 15. As soon as the damping part 8 is rotated in the direction 21 relative to the housing 12 or the central projection 27 the clamping bodies 16, biased by the springs 15 in the narrowing direction of the respective guide groove 17, are clamped between the contact surfaces 18 thereof whereby the damping part 8 is locked to the central projection 27. That is the case in the damping stroke so that accordingly the second damping part non-rotatably connected to the actuating element 7 is then rotated in relation to the first damping component 8 locked in that way. As a result shearing forces act on the damping medium in the free space 28, and those shearing forces produce the damping action. When using dilatant damping media the viscosity or viscousness and therewith the damping action increases with increasing shearing speed in the damping medium. At the end of the damping stroke, the hinge is in a closed position which is not explicitly shown here but which is known in the state of the art. When the hinge is moved back into the FIG. 3 open position again by pivotal movement of the furniture parts secured to the hinge, the return stroke takes place, in which the actuating element 7 and the second damping part 9 connected thereto is rotated back into its starting position again, by the return spring 25. In that case the above-described freewheel according to the invention makes it possible for the first damping part 8 also to move with the second damping part 9, which is particularly advantageous, in particular in relation to dilatant media which have possibly hardened in the preceding damping stroke, or high-viscosity media. In the return stroke the clamping bodies 16 are pushed in the direction 20 by corresponding rotary movement of the first damping component 8 in relation to the central projection 27 or the housing 12, whereby rotation is possible between the projection 27 and the first damping part 8 and therewith a freewheel action can occur.

Figure 9A:
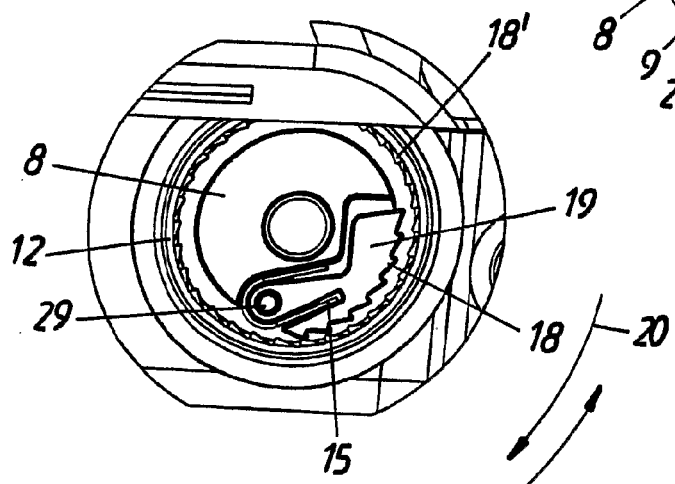
Figure 9B:
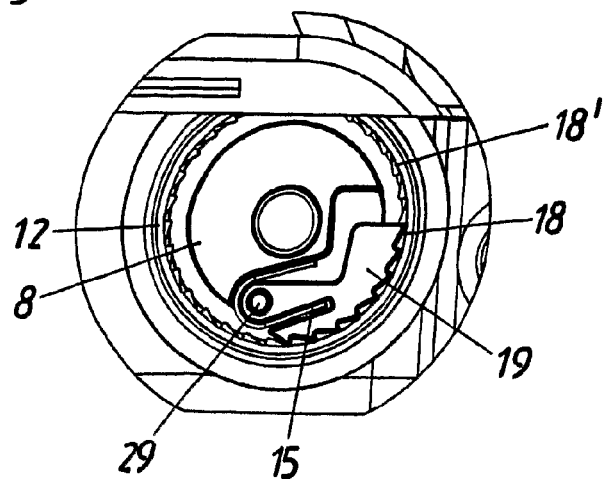
Figure 10:
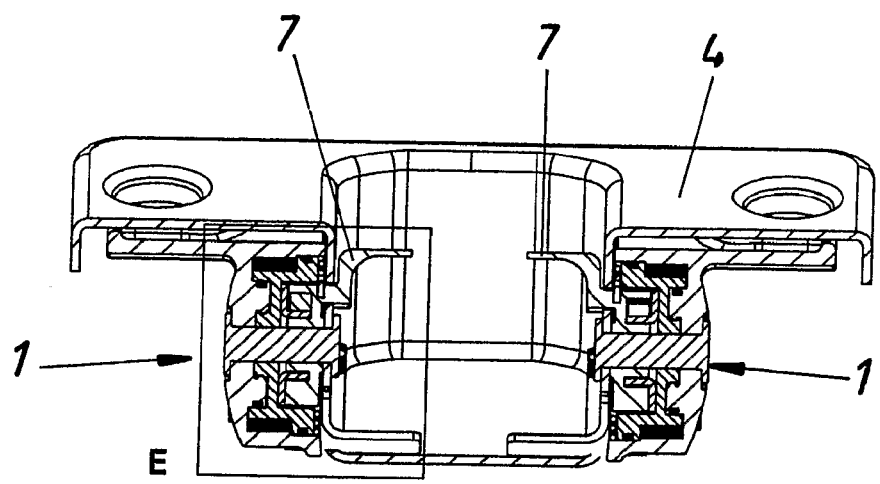
Figure 11:
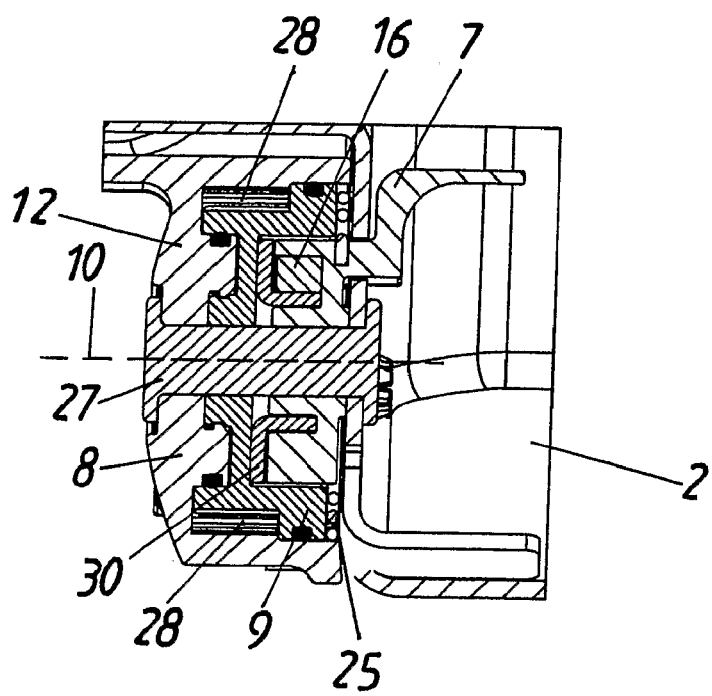

In the embodiment of FIGS. 7 through 9b, instead of the above-described clamping body variant, there is provided an arresting device with a locking pawl 19 biased by means of a spring 15. As shown in the section in FIGS. 7 and 8 that arresting device is also operative between the first damping part 8 and the housing 12. That means that, in the freewheel mode permitting the return stroke, the first damping part 8 can be rotated back relative to the housing 12 together with the second damping part 9 and the actuating element 7 by rotation about the common axis of rotation 10. A return spring 25 is again provided for that return stroke. In this embodiment the actuating element 7 is in one piece with the second damping part 9. As a particularity, it is also to be pointed out that in this embodiment the damping medium is arranged in two annular free spaces 28 which are arranged concentrically relative to each other but which are substantially separated from each other. They are formed on the one hand by a wall of the second damping part 9, that is substantially U-shaped in cross-section, and on the other hand, by an intermediate wall 33 of the first damping part 8, that is introduced into that free space. That variant shows by way of example how the surfaces 23 and 24 provided for the contact with the damping medium can be enlarged by a multi-chamber system. Along those lines, it is also possible to provide still more than two free spaces 28. FIGS. 9*a* and 9*b* show a side view of the locking pawl 19 with its contact surface 18 characterised by a tooth arrangement, and the co-operating tooth arrangement 18' provided on the housing 12. To permit that plan view, the cover 34 of the housing 12 has been omitted in those two Figures. The locking pawl 19 is mounted pivotably about the pivot axis 29 and biased by means of the spring element 15 in the direction of the arresting position shown in FIG. 9*b*. When the first damping part 8 and the locking pawl 19 non-rotatably connected thereto are rotated in a direction 20 with respect to the damper housing 12, the teeth of the tooth arrangement 18, by virtue of the configuration thereof, are lifted out of the tooth arrangement 18' against the biasing force of the spring element 15, thereby providing a freewheel action in that direction for the return stroke. Upon rotation in the opposite direction 21 in contrast the teeth of the contact surface 18 of the locking pawl 19 engage into the co-operating tooth arrangement of the contact surface 18' of the housing 12 so that the first damping part 8 is fixed in its position relative to the housing 12, so that in the damping stroke the actuating element 7 and the second damping part 9 integrally formed thereon rotate about the common axis of rotation 10 with respect to the first damping part 8, whereby the movement is damped by means of the damping medium provided in free spaces 28.

In the above-depicted embodiments, the freewheel is always of such a configuration that the first damping part 8 and the second damping part 9 can move jointly with the actuating element 7 in the return stroke. Now, FIGS. 10 through 13 show a variant in which the freewheel is arranged and is operative between the actuating element 7 and an additional ring 30 fixedly connected to the second damping part 9. In this embodiment the freewheel is provided by means of an arresting device having clamping bodies 16, as is shown in principle in FIG. 6. The clamping bodies 16 arrest the actuating element 7 to the second damping part 9 in the damping stroke and release the actuating element 7 for the return stroke by means of a return spring 25. In this embodiment the first damping part 8 is in one piece with the housing 12. FIG. 12 shows an exploded view illustrating the individual parts of the dampers of FIGS. 10 and 11 which are arranged at the outside wall 3 of the hinge cup 2. FIG. 13 also once again shows as an exploded view in detail the individual components of the arresting device of this embodiment.

Figure 14:
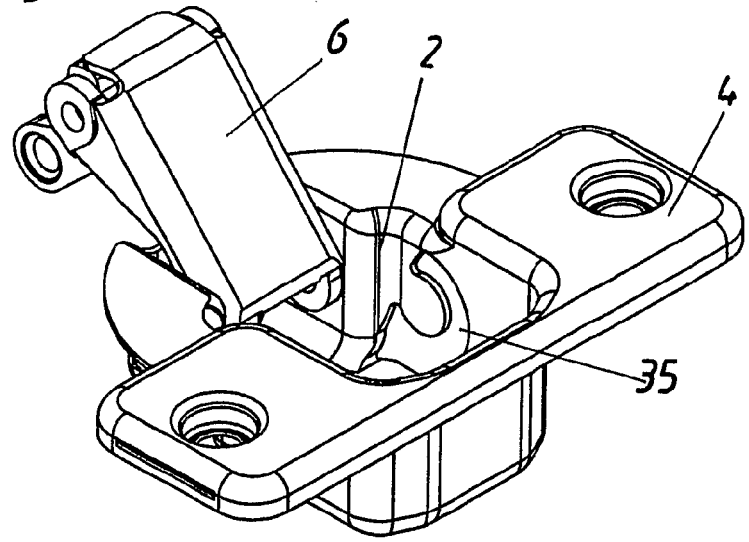
Figure 15:
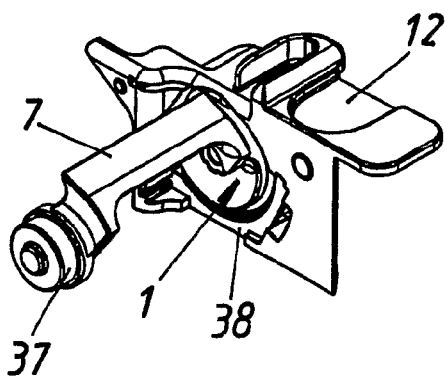
Figure 16:
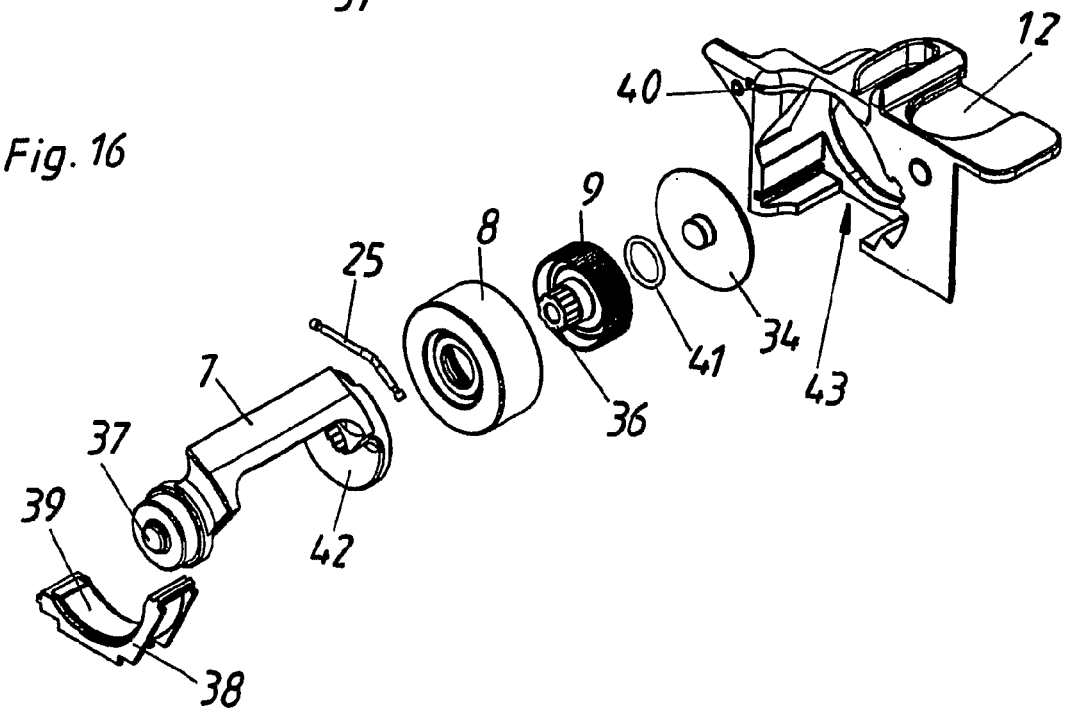

A fourth embodiment according to the invention will now be described with reference to FIGS. 14 through 19. FIG. 14 firstly shows a hinge cup 2 for which the damper 1 in this example is designed. It is also provided here that the damper 1 is mounted laterally to the outside wall 3 of the hinge cup 2 beneath the fixing flange 4. The perspective view in FIG. 14 illustrates the recess 35 in the lateral outside wall 3 of the hinge cup 2, through which the actuating element 7 projects into the interior of the hinge cup 2 in the assembled condition. FIG. 15 shows the essential parts of the fourth embodiment of the damper 1 in the assembled condition. FIG. 16 shows an exploded view of the individual components. A first distinction in relation to the above-described embodiments is that this variant has only one damper 1. In such embodiments, it is desirable in the sense of providing for better support for the actuating element 7 for a mounting roller 37 to be provided on the side of the actuating element 7, that is in opposite relationship to the damping parts 8 and 9, with the mounting roller 37 being mounted in a corresponding opening in the hinge cup 2. That means that fewer moments are transmitted to the mounting arrangement of the damper 1. The second particularly substantial modification in relation to the above-discussed embodiments is that here the arresting device has a brake shoe 38 at which one of the two damping parts 8 and 9 (here the first damping part 8) can be arrested in the arresting position by bearing against the brake shoe 38. In the freewheel position the damping part is spaced from the brake shoe 38 in order to be movable relative to the brake shoe 38.

The exploded view in FIG. 16 firstly shows the opening 43 in the damper housing 12, in which the damping parts 8 and 9 are mounted with play in the assembled condition. In addition a groove 40 for anchoring the return spring 25 is arranged in the housing 12. The brake shoe 38 carries the brake lining 39 and in the assembled condition is mounted in the guide grooves 44 in the damper housing 12. The consequence of that is that the brake shoe 38 at least partially defines the opening 43.

In this embodiment the end of the return spring 25, that is not carried in the groove 40, is held in a groove in a guide disk 42 integrally connected to the actuating element 7. The guide disk 42 carries an internal tooth arrangement into which an external tooth arrangement 36 of the second damping part 9 engages. In this embodiment the actuating element 7 and the second damping part 9 are non-rotatably connected together thereby and both can perform a rotary movement relative to the first damping part 8 in the damping stroke. The damping medium is again operative between the two damping parts 8 and 9. A sealing ring 41 and the cover 34 are provided to afford sealing integrity.

In this embodiment it is thus provided that, in the damping stroke, the actuating element 7 rotates the second damping part 9 relative to the first damping part 8, whereby damping of the movement is produced by way of the damping medium. During the damping stroke the first damping part 8 is pressed against the brake lining 39 of the brake shoe 38 and is thereby arrested in its position. In addition the return spring 25 is stressed in the damping stroke. As soon as the actuating element 7 is released again following the damping stroke, the return spring 25 initiates the return stroke. In that case the first damping part 8 is no longer pressed against the brake shoe 38 and can thereby rotate back into the starting position jointly with the actuating element 7 and the second damping component 9 in the return stroke, whereby once again the freewheel action according to the invention is produced. The brake lining 39 or the brake shoe 38 and also the outside surface of the first damping part 8, in a departure from the embodiment illustrated here, may also have a surface tooth arrangement or a mechanical anchoring means of a different kind for the damping stroke.

Figure 17:
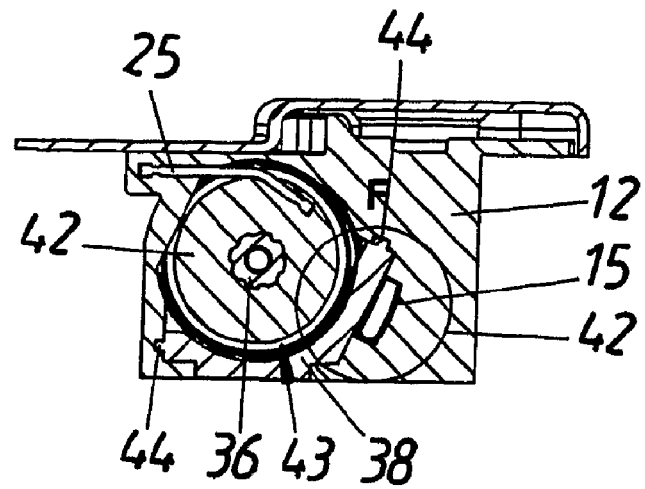
Figure 17A:
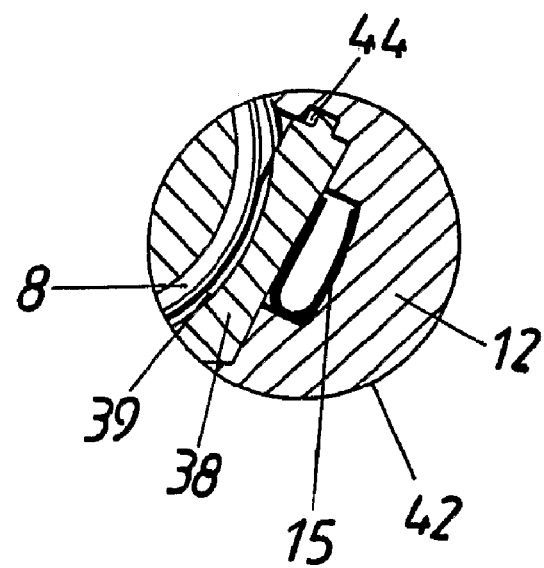
Figure 18:
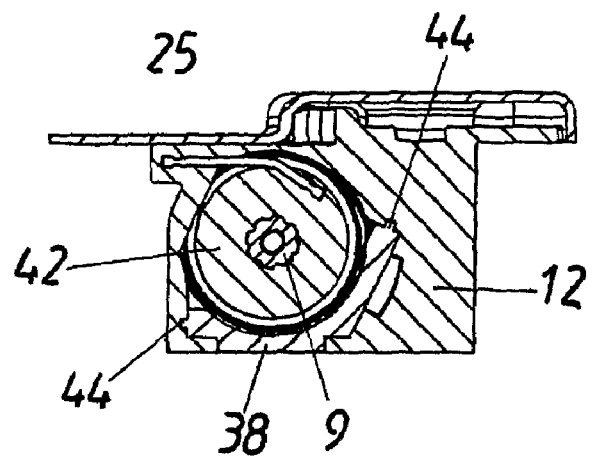

FIG. 17 shows how, in this embodiment, biasing of the brake shoe 38 in the direction of the arresting position can be implemented. The spring element 15 is provided for that purpose. As can be better seen in detail in the portion indicated at 42 in FIG. 17*a*, the spring element 15 urges the brake shoe 38 in the direction of the first damping part 8. To allow a movement, the guide grooves 48 have a certain clearance in this embodiment so that the brake shoe 38 can move relative to the housing 12. The embodiment which is otherwise the same is also shown in a sectional view in FIG. 18, but without biasing of the brake shoe 38. The guide grooves 44 do not here allow any movement of the brake shoe 38 in the direction of the damping part 8. It is thus fixed in its position relative to the housing 12. It will be appreciated that in that case the spring element 15 can then be omitted. In this variant the first damping component 8 is urged by the actuation of the actuating element 7 against the brake shoe 38 in the damping stroke in such a way that an arresting action takes place, without a biasing effect being provided for that purpose.

FIG. 19 shows still a further section through the hinge cup 2 and the damper 1 in accordance with the fourth embodiment. It is possible to clearly see here the way in which the mounting roller 37 is mounted in the hinge cup 2, as well as the interengagement of the damping parts 8 and 9.

It can be seen overall from joint consideration of the above-discussed three embodiments that a wide range of different possible variants of the basic idea illustrated therein are possible. Thus the freewheel configuration can be embodied both between the damper housing 2 and one of the damping parts 8, 9 and also between the actuating element 7 and one of the damping parts 8, 9. It will be appreciated that it is in addition also possible to non-rotatably fix a locking pawl 19 not to one of the damping parts but to the housing 12 or to the actuating element 7. That also applies conversely in regard to the arrangement of the brake shoe 38. The question of whether individual components are now designed integrally or non-rotatably with each other is a matter for the discretion of the person skilled in the art in terms of designing a specific embodiment.

FIGS. 20 and 21 show examples of the way in which the surfaces 23 and 24 intended for contact with the damping medium can be designed. In the FIG. 20 embodiment grooves or teeth 22 are provided for intimate contact with the damping medium. It will be appreciated that they can also be replaced by or supplemented with any other shaped raised portions or recesses such as knobs or the like or roughened surfaces. Particularly if boron-bearing polysiloxane is used as the damping medium, silicone surfaces 23 and 24 which in themselves are macroscopically smooth can however also be provided for contact with the damping medium, as is shown by way of example in FIG. 21. In that sense, like can generally be paired with like, insofar as at least one of and preferably both the damping parts 8, 9 has a surface 23, 24 having the same material or the same material components as the damping medium and intended for contact with the damping medium.

FIG. 22*a* shows an operating curve 31 in respect of the contact point between the outside lever 6 and the actuating element 7 in a section through the hinge cup 2. It will be seen from the operating curve 31 that the spacing relative to the point of rotation of the actuating element 7 does not have to be constant and the damping and transmission properties of the damper can be further influenced by the nature of the configuration of the actuating element 7 and the outside lever 6. That is shown for example by the operating curve 31' in FIG. 22*b*. In this embodiment the hinge lever 6 bears a contour 45, by means of which the configuration of the operating curve 31' is modified in relation to the FIG. 22*a* embodiment.

Figure 25:
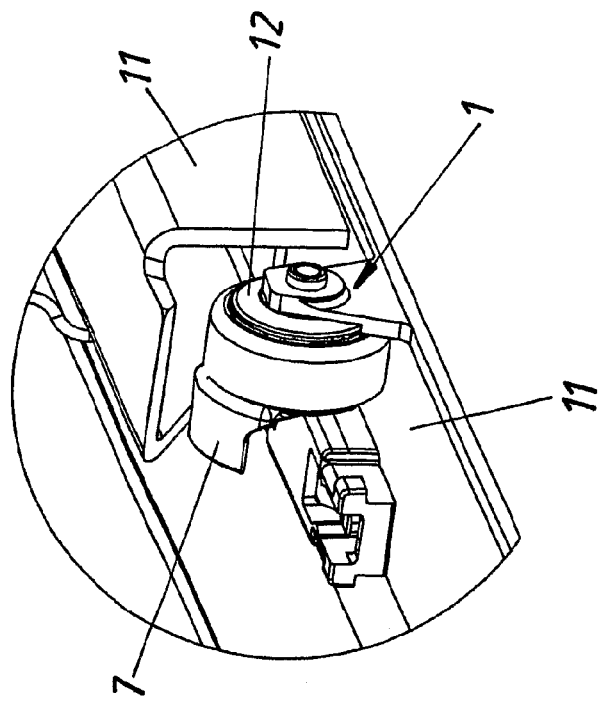
Figure 24:
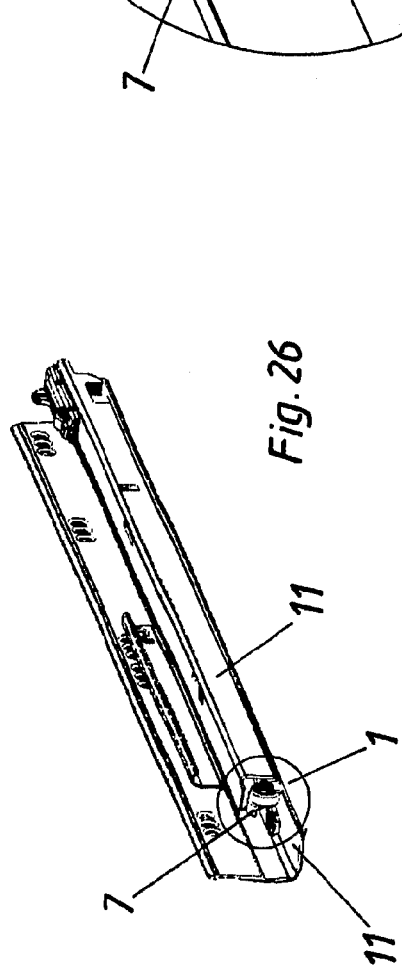
Figure 26:
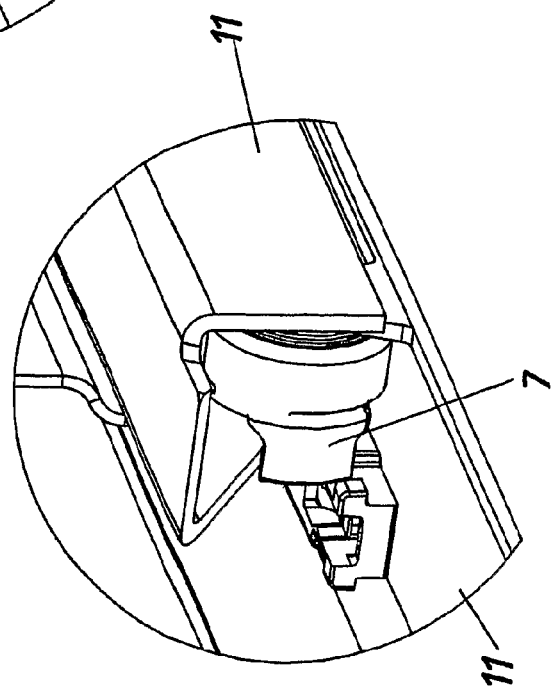

FIGS. 23 through 26 show by way of example how a damper 1 according to the invention can be used in a drawer pull-out guide. The embodiment illustrated here comprises—as is known per se—three guide rails 11 which are displaceable relative to each other. Before reaching the pushed-in end position of the rails 11, the residual speed thereof is gently damped by means of the damper 1. FIG. 24 shows the rails 11 at the beginning of that damping operation, at which one of the rails 11 is encountering the actuating element 7 of the damper, with an inclined surface. FIG. 25 shows that on an enlarged scale. FIG. 26 shows the situation during the damping stroke, in an intermediate position of the actuating element 7. The damper 1 can be designed as in one of the above-described embodiments.

FIGS. 27 through 31 show a second embodiment according to the invention of a damper 1 for drawer pull-out guides. Here the actuating element 7 is in the form of an external tooth arrangement. A rack 26 engages into the tooth arrangement. Shortly before the closed position of the drawer pull-out guide, the rack 26 is again acted upon by one of the guide rails 11 and displaced in the direction 35. FIGS. 29 and 30 once again show the position shortly before the beginning of the damping stroke in which the guide rail 11 meets the rack 26. FIG. 31 shows a detail view illustrating a situation during the damping stroke, in which the rack 26 has already been pushed a good distance beneath the damper 1. The return spring 25 referred to in the above-described embodiments is responsible in the damper itself for the return of the actuating element 7 and the rack 26.

An embodiment according to the invention is also shown in FIGS. 32 and 33, in which the damper 1 is used for damping the relative movement between the adjusting or control arm 14 and the adjusting arm hinge housing of an adjusting arm hinge or an adjusting arm drive for upward folding flaps or the like. In the specifically illustrated embodiment, fixed to the arm 14 is an entrainment projection 32 which, shortly before the closed position of the adjusting arm hinge is reached, meets the actuating element 7 of the damper 1 according to the invention and causes a rotary movement of the actuating element 7, whereby once again the damping stroke is implemented. Freewheel and return functions can once again be implemented in a similar manner to the embodiments already described hereinbefore.

The numerous embodiments described are proof that the invention is not limited to what is explicitly shown here. In particular the term damping or return stroke, as already shown in the specific embodiments, does not necessarily describe a linear movement. Rather this can involve the explicitly described rotary stroke movements, but it can also involve movements occurring along other geometrical paths. The return element can be not just in the form of a return spring—as explicitly shown here—but for example can also be in the form of a coupling device for connection to one of the movable furniture parts and/or furniture fitment components. Thus the actuating element 7 of the damper can also be entrained by way of that coupling device (not shown here) by the hinge lever 6 of a hinge or a guide rail 11 of a drawer pull-out guide or by an adjusting arm 14 of an adjusting arm hinge, in the return movement of the respective component, in order in that way to afford the return stroke of the damper or the actuating element 7.

The invention claimed is:

1. A damper for movable furniture parts and/or pieces of furniture fittings being movable relative to each other, the damper comprising:
   a first damping part and a second damping part, the first and second damping parts being mounted rotatably relative to each other in a damping stroke of the damper;
   a damping medium arranged or operative between the first and second damping parts;

at least one actuating element operatively connected to the second damping part at least in the damping stroke of the damper; and an arresting device arranged between the at least one actuating element and the second damping part, the arresting device fixedly coupling the at least one actuating element to the second damping part in the damping stroke of the damper and the arresting device uncoupling the at least one actuating element from the second damping part to provide a freewheel relationship in a return stroke of the damper so as to release the at least one actuating element from the second damping part, wherein the arresting device includes at least one movably mounted arresting element which is spring-loaded by a spring element in a direction of an arresting position, such that the at least one arresting element in the arresting position couples the at least one actuating element to the second damping part, the spring element being operative between the at least one arresting element and at least one of the second damping part and the at least one actuating element.

2. A damper as set forth in claim 1, wherein a holding part that holds at least one of the first damping part and the second damping is formed by a damper housing or by a central projection.

3. A damper as set forth in claim 1, wherein the first and second damping parts and the at least one actuating element reach a starting position for the damping stroke at an end of the return stroke.

4. A damper as set forth in claim 1, wherein at least one of the first and second damping parts is rotatable during the damping stroke, exclusively, relative to another of the first and second damping parts.

5. A damper as set forth in claim 1, wherein the at least one actuating element is rotatable, exclusively, during at least one of the damping stroke and the return stroke.

6. A damper as set forth in claim 4, wherein the at least one actuating element and at least one of the first and second damping parts are mounted rotatably about a common axis of rotation.

7. A damper as set forth in claim 1,
wherein the at least one actuating element and the first and second damping parts form a structural unit which is inseparable during an operation of the damper, and
wherein the structural unit is provided for mounting to only one of the mutually relatively movable furniture parts and/or to only one of the pieces of the furniture fittings.

8. A damper as set forth in claim 1, wherein the arresting device is arranged or is operative between the at least one actuating element and one of the first and second damping parts or between one of the first and second damping parts and a damper housing, which is provided for fixing to only one of the movable furniture parts and/or to only one of the pieces of the furniture fittings.

9. A damper as set forth in claim 1, wherein in the damping stroke the arresting device arrests the at least one actuating element and one of the first and second damping part to each other in the arresting position, and in a freewheel position the arresting device releases the at least one actuating element and the one of the first and second damping parts for a relative movement with respect to each other.

10. A damper as set forth in claim 1, wherein in the damping stroke the arresting device arrests one of the first and second damping parts and a damper housing, which is provided for fixing to only one of the movable furniture parts and/or to only one of the pieces of the furniture fittings, in the arresting position, and in a freewheel position the arresting device releases the one of the first and second damping parts and the damper housing for a relative movement with respect to each other.

11. A damper as set forth in claim 1, wherein the at least one arresting element includes at least one or a plurality of cylindrical or spherical clamping bodies.

12. A damper as set forth in claim 11, wherein the clamping body or clamping bodies is or are guided in a guide groove or guide grooves narrowing in a direction.

13. A damper as set forth in claim 12, wherein the clamping body or clamping bodies is or are biased in the direction in which the guide groove narrows or the guide grooves narrow, by means of the spring element.

14. A damper as set forth in claim 12, wherein a contact surface of the guide groove or guide grooves is connected fixedly to the at least one actuating element and an oppositely disposed contact surface of the guide groove or guide grooves is connected fixedly to one of the first and second damping parts or vice-versa.

15. A damper as set forth in claim 12, wherein a contact surface of the guide groove or guide grooves is connected fixedly to one of the first and second damping parts and an oppositely disposed contact surface of the guide groove or guide grooves is connected fixedly to a damper housing, which is provided on only one of the movable furniture parts and/or on only one of the pieces of the furniture fittings, or vice-versa.

16. A damper as set forth in claim 1, wherein the arresting element comprises a locking pawl biased by means of the spring element.

17. A damper as set forth in claim 16, wherein the locking pawl is mounted pivotably.

18. A damper as set forth in claim 16, wherein the locking pawl has a first contact surface, of a tooth arrangement, which in a freewheel direction or in the return stroke permits a movement relative to a second contact surface, of a co-operating tooth arrangement, freely or under the application of a lesser force than in an arresting direction in which it locks a movement of the first contact surface relative to the second contact surface.

19. A damper as set forth in claim 18, wherein the first contact surface of the locking pawl is connected fixedly to the actuating element and the oppositely disposed contact surface is connected fixedly to one of the damping parts or vice-versa.

20. A damper as set forth in claim 18, wherein the first contact surface of the locking pawl is connected fixedly to one of the damping parts and the oppositely disposed contact surface is connected fixedly to a damper housing of the damper, that is provided for fixing to only one of the mutually relatively movable furniture parts and/or the pieces of the furniture fittings or vice-versa.

21. A damper as set forth in claim 1, wherein the arresting element comprises a brake shoe.

22. A damper as set forth in claim 21, wherein one of the two damping parts can be arrested in the arresting position by bearing against the brake shoe thereat and in the freewheel position is so spaced from the brake shoe that it is movable relative to the brake shoe.

23. A damper as set forth in claim 21, wherein the brake shoe is biased in the direction of its arresting position, by means of the spring element.

24. A damper as set forth in claim 21, wherein the brake shoe at least partially delimits an opening, in a damper housing, wherein at least one of the two damping parts is mounted, with play, in the opening.

25. A damper as set forth in claim 1, wherein at least one of the first and second damping parts has a macroscopic surface structure, with knobs, grooves, teeth, depressions, and/or raised portions or has a roughened surface structure for increasing a size of a surface provided for contact with the damping medium.

26. A damper as set forth in claim 1, wherein at least one of the first and second damping parts has a surface which has a same material or same material components as the damping medium and which is provided for contact with the damping medium.

27. A damper as set forth in claim 1, wherein the surfaces of the damping parts, that are provided for contact with the damping medium, are arranged concentrically, in the form of concentric cylinder peripheral surfaces.

28. A damper as set forth in claim 1, wherein a return element, in the form of a return spring or a coupling device for connection to one of the movable furniture parts and/or the pieces of furniture fittings, for a return stroke.

29. A damper as set forth in claim 1, wherein the damping medium is a Newtonian fluid including a Newtonian liquid, or a dilatant fluid including a dilatant liquid.

30. A damper as set forth in claim 1, wherein the damping medium has or is a boron-bearing polysiloxane.

31. A damper as set forth in claim 1, wherein the damping medium runs, plastically and/or viscously, in a case of a shear loading at a first shearing speed, and predominantly elastically reacts in a case of a shock-like shear loading at a second shearing speed higher than the first shearing speed.

32. A furniture hinge comprising the damper as set forth in claim 1.

33. A furniture hinge as set forth in claim 32,
wherein a housing of the damper is arranged, fixed, on a first abutment part being a hinge cup of the furniture hinge, and
wherein the at least one actuating element can be acted upon by a second abutment part of the furniture hinge or a hinge lever of the furniture hinge.

34. A furniture hinge as set forth in claim 32, wherein a housing of the damper is arranged externally on a hinge cup, at an outside wall of the hinge cup which is lateral in an assembly position, and/or beneath a fixing flange of the hinge cup in the assembly position.

35. A drawer pull-out guide comprising a damper as set forth in claim 1.

36. A drawer pull-out guide as set forth in claim 35 comprising at least two guide rails which are displaceable relative to each other, wherein a housing of the damper is arranged on or fixed to one of the guide rails and the actuating element of the damper can be acted upon by another guide rail or an additional part actuated by said other guide rail.

37. An adjusting arm hinge, in particular an actuating drive, for an upward folding flap, comprising a damper as set forth in claim 1.

38. An adjusting arm hinge as set forth in claim 37 comprising an adjusting arm hinge housing and an adjusting arm, wherein a housing of the damper is arranged on or fixed to the adjusting arm hinge housing and the actuating element of the damper can be acted upon by the adjusting arm or an additional part actuable thereby, or vice-versa.

\* \* \* \* \*